July 16, 1946.  A. L. PARKER  2,404,142
TUBE COUPLING
Filed Sept. 14, 1940
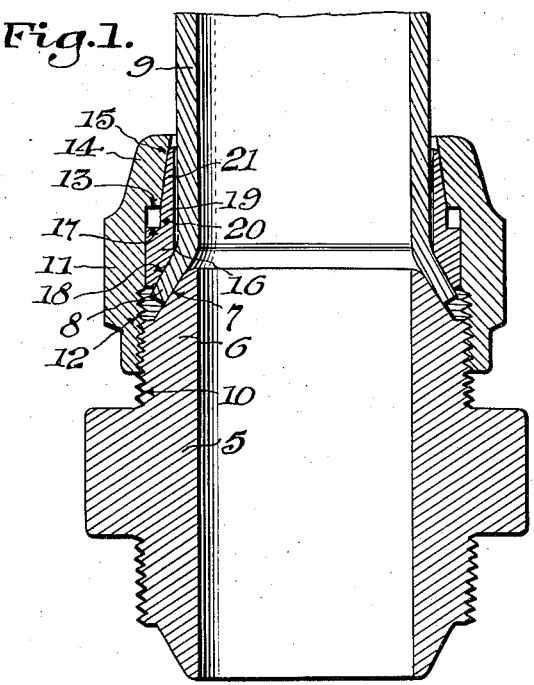
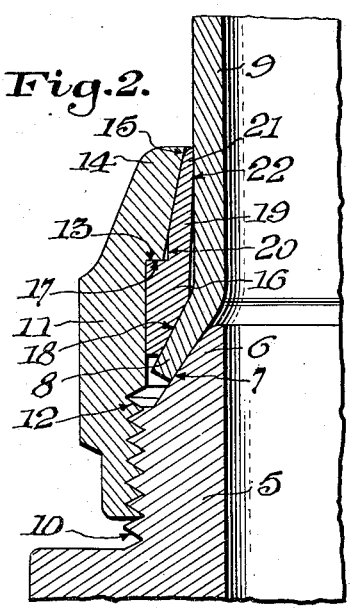
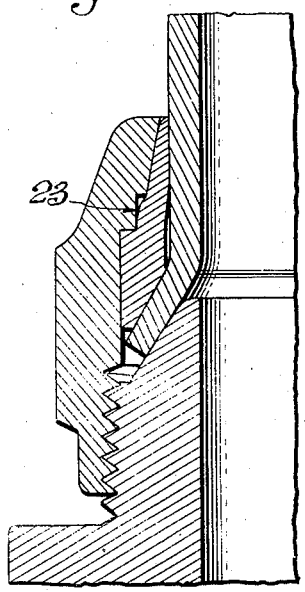
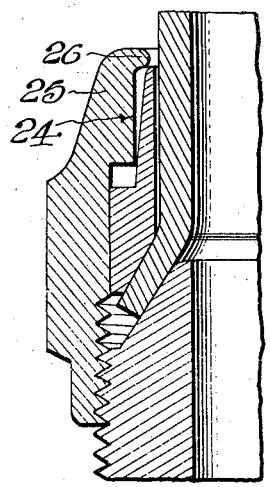
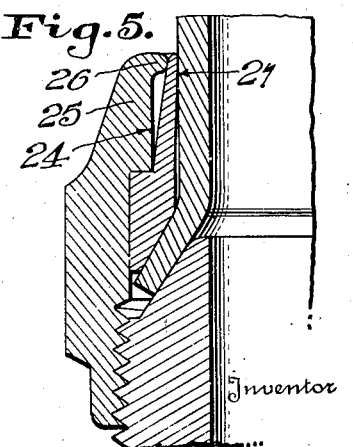
Inventor
Arthur L. Parker
By Mason & Porter
Attorneys Patented July 16, 1946

2,404,142

UNITED STATES PATENT OFFICE 2,404,142

TUBE COUPLING

Arthur L. Parker, Cleveland, Ohio, assignor of one-half to Logansport Machine, Incorporated, Logansport, Ind., and one-half to The Parker Appliance Company, Cleveland, Ohio, a corporation of Ohio Application September 14, 1940, Serial No. 356,845

1 Claim. (Cl. 285—86)

The invention relates to new and useful improvements in tube couplings, and more particularly to a tube coupling for clamping the flared end of a tube, and it primarily seeks to provide a novel tube coupling of the character stated in which provision is made for effectively clamping the tube against vibration at a point spaced a distance above the flared end of the tube.

Couplings of the character stated include threadably connected male and female elements between which the flared end of the tube to be coupled is clamped, said male element including a coniform extension receivable within the tube flare, and said female element being formed in two parts, one a clamping sleeve having an abutment shoulder and a flared seat for engaging and clamping the tube flare against the coniform extension, and the other a nut threadable onto the male element and including an abutment shoulder engageable with the clamping sleeve shoulder for forcing the sleeve into flare clamping contact with the tube. In these couplings the tubes are securely clamped at the flared end alone and are relatively free to vibrate throughout their length and right down to the clamped flare. This is objectionable and it is the purpose of the present invention to provide an improved tube coupling in which provision is made for clamping each tube against vibration not only at the extreme flared end thereof but also at a point spaced well above or in advance of said flared end.

In its more detailed nature the invention resides in the provision of an improved form of tube coupling of the character stated in which the nut and clamping sleeve, together comprising the female element, include surfaces designed to engage during the threading home of the nut incident to the effecting of a tube coupling and cause the clamping sleeve to firmly grip the tube at a point spaced a considerable distance above or in advance of the flared end thereof.

Another object of the invention is to provide an improved tube coupling of the character stated in which the surfaces of the nut and clamping sleeve which engage in causing the sleeve to grip or clamp the tube at a point spaced from the flared end of the tube is substantially a line contact only, thereby to minimize friction and the tendency of the sleeve to turn with the nut.

With the above and other objects in view that will hereinafter appear, the nature of the invention will be more clearly understood by following the detailed description, the appended claim, and the several views illustrated in the accompanying drawing.

In the drawing:

Figure 1 is a central longitudinal section of a tube coupling embodying the invention, the loose assembly condition of the coupling being illustrated.

Figure 2 is an enlarged fragmentary sectional view of the coupling of Figure 1 and illustrates the fully clamped condition of the coupling.

Figure 3 is a view similar to Figure 2 illustrating a modified form of the invention in which a sleeve bend limiting clearance is formed in the coupling nut.

Figures 4 and 5 are sectional views similar to Figures 1 and 2 and illustrating a modified form of the invention in which the sleeve clamping function is effected by line contact engagement of the nut with the clamping sleeve.

Figure 6 is a detail perspective view illustrating a modified form of clamping sleeve.

In the coupling herein disclosed as an example of embodiment of the invention there is included a male member and a female member threadably connected, the female member being formed of two parts, a nut and a clamp sleeve, and the tube to be coupled is firmly clamped between these male and female members.

The male coupling member 5 includes a coniform seat extension 6 which presents a tapered clamping surface 7 for engaging in the flared end 8 of the tube 9 which is to be clamped in the coupling. The male member is externally threaded as at 10 to receive the female member, and it will be observed by reference to Figure 1 of the drawing that the bore in the male member and the bore in the tube to be coupled are of substantially the same diameter.

The female member, which is formed of two parts, comprises a nut or clamp member 11 which is internally threaded as at 12 and includes an abutment shoulder 13 preferably formed in an elongated extension 14 extending upwardly from said nut and having a tapered bore 15. The second part of the female member comprises a clamp sleeve 16 which surrounds the tube 9 within the nut 11, and this sleeve includes a lower enlargement providing an abutment shoulder 17 adapted to be engaged by the abutment shoulder 13 of the nut and which has the lower end of its bore flared as at 18 for engaging the flared end 8 of the tube 9. The sleeve 16 also includes a clamping extension 19 which projects upwardly from the enlargement at the position of the abutment shoulder 17, and this extension includes a cylindrical portion 20 just above the abutment shoulder 17 and terminates in a tapered, thinned portion 21.

It will be obvious by reference to Figures 1 and 2 of the drawing that when the nut 11 is screwed home upon the male member 5 the abutment shoulder 13 thereof will ultimately engage the abutment shoulder 17 of the clamping sleeve 16 and cause the flared end 8 of the tube 9 to be firmly gripped or clamped between the clamping surfaces 7 and 18 respectively presented by the male extension 6 and the enlargement of the clamping sleeve 16. As the nut 11 moves down over the external threads of the male member 5, the engaging tapered surfaces formed at 15 on the nut and on the exterior of the sleeve extension 21 will cause the thinned sleeve extension to be displaced inwardly and into tight clamping engagement with the external surface of the tube 9 in the manner clearly illustrated in Figure 2 of the drawing. By this means the tube is securely clamped at the flared end thereof between the clamping surfaces 7 and 18 and is also securely clamped as at 22 by the inwardly displaced sleeve extension 21 at a point spaced a considerable distance above the flared end of the tube.

By reason of the provision of the cylindrical portion 20 of the sleeve extension 19, the inward bending effect upon the sleeve extension is confined to the upper portion thereof and does not reach the vicinity of the abutment shoulder 17. It will be readily recognized that it would take considerably more force to collapse the enlarged head of the sleeve inwardly, and it is for this reason that the cylindrical portion 20 is provided as a relief. By collapsing or inwardly depressing the thinned wall at the upper portion of the sleeve extension 19, the sleeve is made to firmly grip the tube 9 at a point spaced well above the flared end thereof, and this sleeve extension clamping effect serves to check vibrations before they reach the flared end of the tube.

In Figure 3 of the drawing there is illustrated a slight modification of the coupling in which the clearance intended to limit the bending area of the sleeve extension is formed as at 23 in the nut instead of in the form of a cylindrical wall on the clamping sleeve. In all other respects the coupling of Figure 3 is constructed and functions in the same manner as the coupling disclosed in Figures 1 and 2, and additional description of this modified form of coupling is thought to be unnecessary.

From the foregoing it will be apparent that the thinned and tapered extension of the clamping sleeve can be formed with or without the cylindrical, bending area determining portion.

In Figures 4 and 5 of the drawing another modified form of the invention is shown. In this form of the invention an annular clearance is provided in the upward extension of the nut, and this clearance is effected to provide a thinned portion 25 terminating in an inwardly directed extension or bead 26 disposed to engage the upper tapered and thinned end of the clamping sleeve in line contact as the female member is threaded home on the externally threaded male member. As the female member is threaded onto the male member, the bead or extension 26 forces the upper end of the clamping sleeve into intimate clamping contact with the tube in the manner indicated at 27 in Figure 5 of the drawing, thus clamping the tube at a point well above the clamped flared end thereof in a manner and for the same purposes hereinbefore described.

The advantages of providing line contact between the nut and the clamping sleeve through the inwardly directed rib 26 will be obvious for by this means turning friction of the nut upon the sleeve is lessened. Unless this provision of line contact between the nut and the clamping sleeve is made, there is a considerable amount of friction generated between the nut and the sleeve as the nut is threaded home on the male member and the sleeve is likely to turn with the nut upon the tube. This is objectionable for several reasons. One is that the sleeve as it grips the tube causes the tube to turn also. Another reason is that if the tube is in some manner prevented from turning with the nut and the clamping sleeve, the clamping sleeve will wipe over the flared end of the tube in abrasive contact. Another reason is that there would be a greater turning torque required to thread the nut upon the fitting in couplings not provided with the line contacting bead 26. Provision of the thinned potrion 26 may also be utilized to render the nut extension yieldable so that it would be capable of slight expansion in the region of the line contact with the tapered clamping sleeve so that in case the sleeve has been forced into tight contact with the tube and the abutment shoulder of the nut and the clamping sleeve are not yet in contact, the thinned portion 25 of the nut extension could expand slightly as it advanced on the tapered surface of the clamping sleeve until the abutment shoulders properly engage. This feature compensates for machining tolerances and also slight fluctuations in the diameters of tubes to be coupled.

If desired, the clamping sleeve can be longitudinally slitted as at 28 so as to facilitate bending of the upper extremity thereof into clamping contact with the tube to be clamped. This modification of the clamping sleeve is illustrated in Figure 6 of the drawing.

It is to be understood that the dimensions and structural detail of the various coupling parts can be altered to suit the demands of different installations without departing from the scope of the invention as defined in the appended claim.

Having thus described the invention, what I claim as new and desire to secure by Letters Patent is—

In a coupling for tubes, coupling members having threaded engagement, one of the coupling members having a seat adapted to engage the inner face of the flared end of a tube, the other coupling member having a clamping shoulder on its inner face disposed in a plane at right angles to the longitudinal axis of the coupling members, a clamping sleeve surrounding the tube within said last-named coupling member and having at its inner end a solid head provided with a coniform face engageable with the outer face of the flared end of the tube, said solid head at the outer portion thereof being disposed in a plane at right angles to the axis of the coupling members and forming a clamping shoulder adapted to cooperate with the clamping shoulder on said last-named coupling member, said sleeve being extended from said head outwardly and having its external surface tapered, said last-named coupling member between the clamping shoulder thereon and the outer end thereof being shaped so as to engage said tapered surface for contracting the outer end portion of the sleeve into engagement with the tube for damping vibrations imparted thereto, said clamping shoulders being initially spaced from each other to permit relative movement of said coupling member and the sleeve for contracting said sleeve and operating when brought into contact to limit further contraction of the sleeve, said shoulders when in contact also operating as a means for positively forcing the sleeve into clamping engagement with the tube for firmly clamping said tube against the seat on said first-named coupling member.

ARTHUR L. PARKER.